(12) United States Patent
Clark et al.

(10) Patent No.: US 11,035,243 B2
(45) Date of Patent: Jun. 15, 2021

(54) SEAL ASSEMBLY FOR GAS TURBINE ENGINES

(71) Applicant: United Technologies Corporation, Farmington, CT (US)

(72) Inventors: Thomas E. Clark, Sandford, ME (US); Kevin D. Tracy, Biddeford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 455 days.

(21) Appl. No.: 15/995,328

(22) Filed: Jun. 1, 2018

(65) Prior Publication Data

US 2019/0368366 A1  Dec. 5, 2019

(51) Int. Cl.
*F01D 11/08* (2006.01)
*F01D 25/00* (2006.01)
*F01D 25/12* (2006.01)

(52) U.S. Cl.
CPC ............ *F01D 11/08* (2013.01); *F01D 25/005* (2013.01); *F01D 25/12* (2013.01); *F05D 2220/323* (2013.01); *F05D 2230/60* (2013.01); *F05D 2240/11* (2013.01); *F05D 2300/20* (2013.01); *F05D 2300/603* (2013.01)

(58) Field of Classification Search
CPC .................................................... F01D 11/125
See application file for complete search history.

(56) References Cited

U.S. PATENT DOCUMENTS

| 4,087,199 | A | * | 5/1978 | Hemsworth | ............ | F01D 11/08 |
| | | | | | | 415/173.3 |
| 6,733,235 | B2 | | 5/2004 | Alford et al. | | |
| 9,039,358 | B2 | | 5/2015 | Tholen et al. | | |

(Continued)

FOREIGN PATENT DOCUMENTS

| EP | 2784272 | 10/2014 |
| EP | 3156606 | 4/2017 |

(Continued)

OTHER PUBLICATIONS

European Search Report for European Patent Application No. 19177484.3 completed Jul. 24, 2019.

*Primary Examiner* — Kayla Mccaffrey
(74) *Attorney, Agent, or Firm* — Carlson, Gaskey & Olds/Pratt & Whitney

(57) ABSTRACT

A seal assembly for a gas turbine engine according to an example of the present disclosure includes, among other things, a support mountable to an engine static structure. The support has a main body extending axially between leading and trailing edge portions and circumferentially between opposed mate faces, and the main body includes a pair of opposed retention hooks extending inwardly from the leading and trailing edge portions to bound an elongated groove extending circumferentially between the opposed mate faces. A seal has a sealing portion that extends from an engagement portion. The sealing portion has a sealing face that extends circumferentially between first and second mate faces. An overwrap has one or more plies that follow a perimeter of the engagement portion to define an interface between the retention hooks and the engagement portion. A method of sealing is also disclosed.

22 Claims, 5 Drawing Sheets

(56) References Cited

U.S. PATENT DOCUMENTS

| | | | |
|---|---|---|---|
| 9,267,388 B2* | 2/2016 | Mizokami | F01D 9/04 |
| 2011/0293410 A1 | 12/2011 | Marusko et al. | |
| 2014/0271145 A1* | 9/2014 | Thomas | F01D 11/24 |
| | | | 415/173.1 |
| 2016/0258304 A1 | 9/2016 | Sippel et al. | |
| 2016/0376921 A1* | 12/2016 | O'Leary | F01D 25/12 |
| | | | 415/116 |
| 2018/0156068 A1* | 6/2018 | Roussille | F01D 25/246 |

FOREIGN PATENT DOCUMENTS

| | | |
|---|---|---|
| EP | 3255252 | 12/2017 |
| EP | 3444440 | 2/2019 |
| WO | 2015023576 | 2/2015 |

* cited by examiner

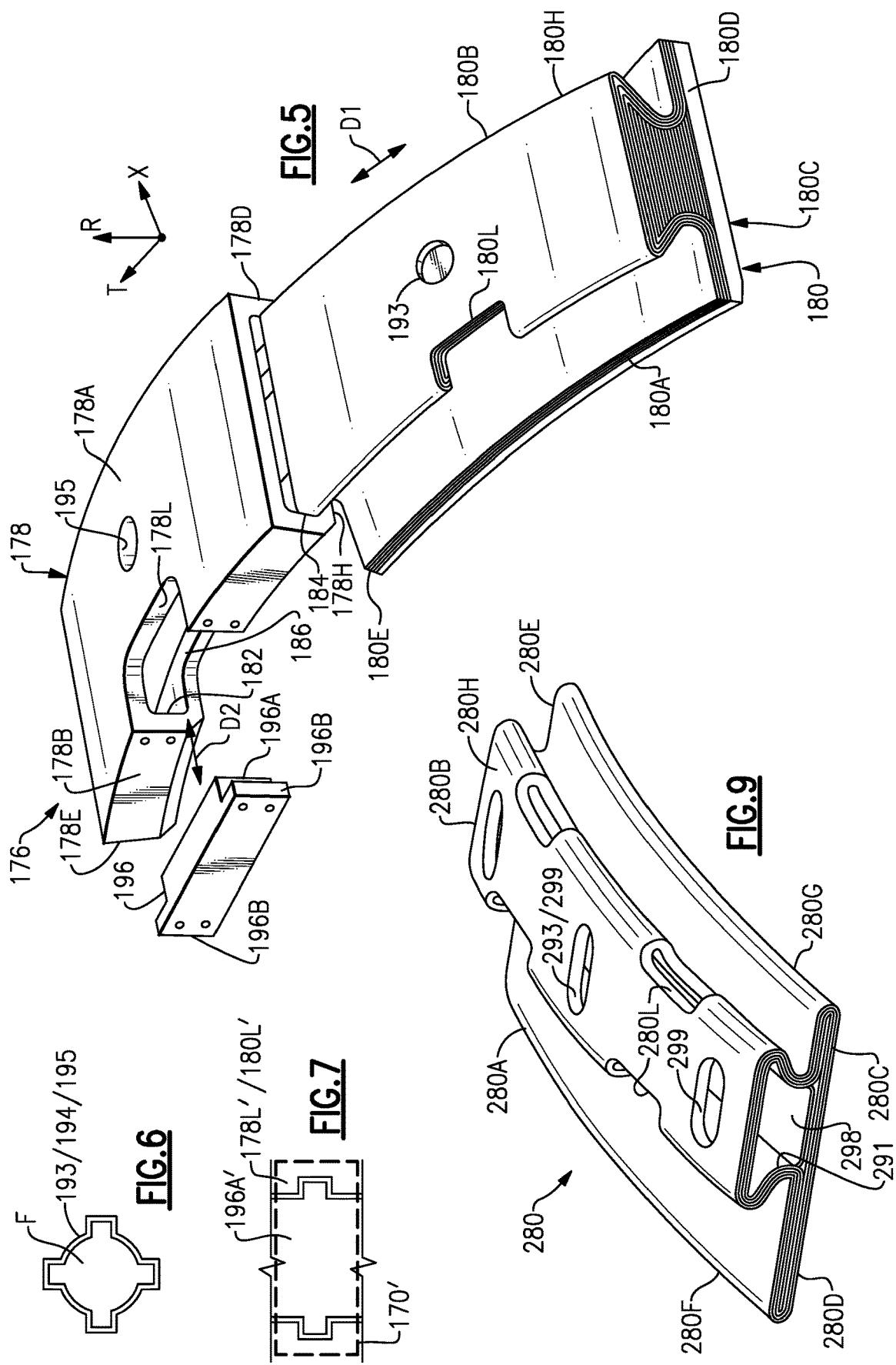

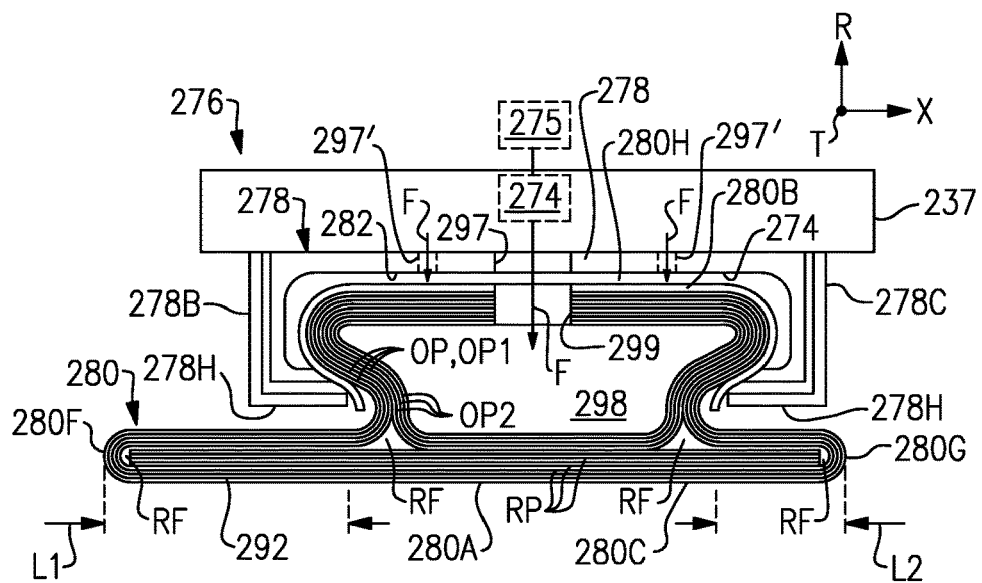
FIG.8
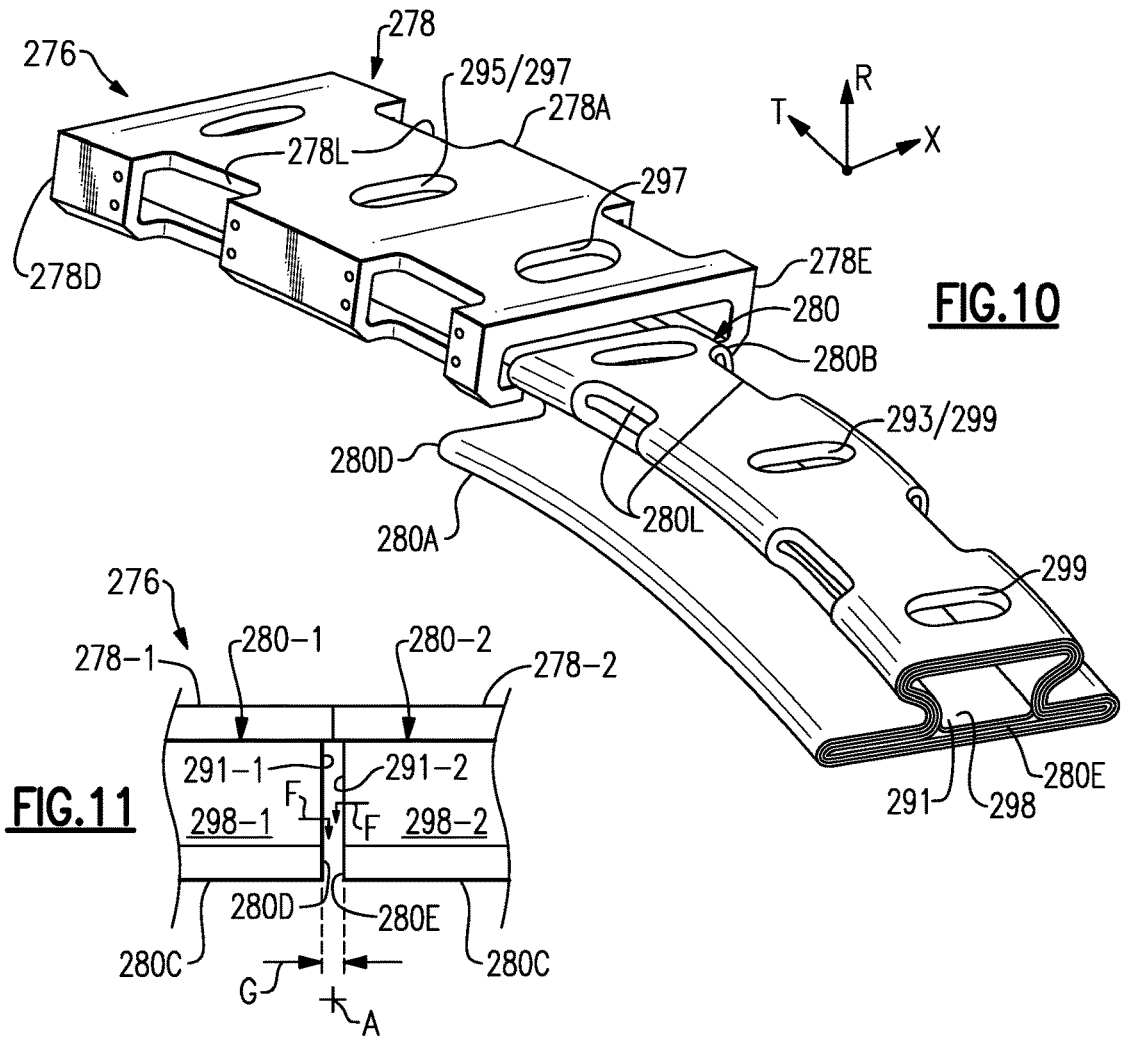
FIG.10
FIG.11

SEAL ASSEMBLY FOR GAS TURBINE ENGINES

BACKGROUND

This disclosure relates to sealing for adjacent components of a gas turbine engine, including a mounting arrangement for seals.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are mounted to the engine static structure. The arc segments are exposed to relatively hot gases in the gas flow path and may be configured to receive cooling airflow to cool portions of the shrouds.

SUMMARY

A seal assembly for a gas turbine engine according to an example of the present disclosure includes a support mountable to an engine static structure. The support has a main body extending axially between leading and trailing edge portions and circumferentially between opposed mate faces, and the main body includes a pair of opposed retention hooks extending inwardly from the leading and trailing edge portions to bound an elongated groove extending circumferentially between the opposed mate faces. A seal has a sealing portion that extends from an engagement portion. The sealing portion has a sealing face that extends circumferentially between first and second mate faces. An overwrap has one or more plies that follow a perimeter of the engagement portion to define an interface between the retention hooks and the engagement portion.

In a further embodiment of any of the foregoing embodiments, the perimeter defines a dovetail geometry that mates with the retention hooks along the interface to secure the seal.

In a further embodiment of any of the foregoing embodiments, the engagement portion includes a core surrounded by the overwrap.

In a further embodiment of any of the foregoing embodiments, the overwrap has a first fiber construction defined by the one or more plies, and the core has a second fiber construction that differs from the first fiber construction.

In a further embodiment of any of the foregoing embodiments, the sealing portion comprises ceramic.

In a further embodiment of any of the foregoing embodiments, the engagement portion defines an internal cavity that extends circumferentially between the first and second mate faces.

In a further embodiment of any of the foregoing embodiments, the one or more plies includes a first set of plies that follow the perimeter of the engagement portion and a second set of plies that follow a perimeter of the internal cavity.

In a further embodiment of any of the foregoing embodiments, the seal includes a set of reinforcement plies that extend along the first and second set of plies to define the sealing portion.

In a further embodiment of any of the foregoing embodiments, the engagement portion defines one or more cooling passages in fluid communication with the internal cavity, and the main body defines one or more apertures that interconnect the one or more cooling passages with a coolant source.

In a further embodiment of any of the foregoing embodiments, the engagement portion defines openings to the internal cavity along the first and second mate faces.

In a further embodiment of any of the foregoing embodiments, the support defines a first retention feature along one of the leading edge portion and the trailing edge portion, and the first retention feature cooperates with a clip insertable into the first retention feature and a second retention feature defined in the engagement portion of the seal to limit relative movement.

In a further embodiment of any of the foregoing embodiments, the engagement portion defines a backside face opposite the sealing face. The seal defines a width between the sealing face and the backside face, the sealing portion defines a length between a leading edge and a trailing edge, and a ratio of the width to the length is less than 1:2.

In a further embodiment of any of the foregoing embodiments, the seal is a blade outer air seal (BOAS).

A gas turbine engine according to an example of the present disclosure includes an engine case extending along an engine axis, an array of blades rotatable about the engine axis, and a seal assembly that has an array of supports and an array of blade outer air seals. The array of supports are distributed about the engine axis. The array of supports are mechanically attached to the engine case. Each of the supports has a main body extending axially between leading and trailing edge portions and circumferentially between opposed mate faces with respect to the engine axis, and the main body has a pair of opposed retention hooks that bound an elongated groove extending circumferentially between the opposed mate faces with respect to the engine axis. The array of blade outer air seals are distributed about the array of blades. Each of the seals include a sealing portion that extends from an engagement portion. The sealing portion has a sealing face that extends circumferentially between first and second mate faces to bound a core flow path. An overwrap has a plurality of plies that follow a perimeter of the engagement portion to define an interface. The engagement portion is slideably received through an opening defined in one of the opposed mate faces and at least partially into the elongated groove to secure the seal to a respective one of the supports along the interface.

In a further embodiment of any of the foregoing embodiments, the perimeter defines a dovetail geometry that mates with the retention hooks along the interface to secure the seal.

In a further embodiment of any of the foregoing embodiments, the engagement portion includes a core surrounded by the overwrap. The overwrap has a first fiber construction defined by the plurality of plies, and the core has a second fiber construction that differs from the first fiber construction.

In a further embodiment of any of the foregoing embodiments, the engagement portion defines an internal cavity that extends circumferentially between the first and second mate faces, and the engagement portion defines one or more cooling passages that interconnect the internal cavity and a cooling plenum defined by the engine case.

A method of sealing a gas turbine engine according to an example of the present disclosure includes securing a support to an engine static structure. The support has a main body extending axially between leading and trailing edge portions and circumferentially between opposed mate faces. The body has a pair of opposed retention hooks that bound an elongated groove extending circumferentially between the opposed mate faces. The method includes securing a blade outer air seal to the support. The seal includes a sealing portion that extends from an engagement portion. The sealing portion has a sealing face that extends circumferentially between first and second mate faces to bound a gas path. An overwrap that has one or more plies that follow a perimeter of the engagement portion to define an interface between the retention hooks and the engagement portion. The engagement portion is slideably received through an opening defined in one of the opposed mate faces and then at least partially into a circumferentially extending groove to secure the seal to the support along the interface.

In a further embodiment of any of the foregoing embodiments, the engagement portion defines an internal cavity that extends circumferentially between the first and second mate faces, and the engagement portion defines one or more cooling passages that interconnect the internal cavity and a coolant source. The method includes the step of communicating cooling flow from the coolant source to the one or more cooling passages, and then into the internal cavity.

A further embodiment of any of the foregoing embodiments includes communicating cooling flow from the internal cavity into an intersegment gap defined by a respective one of the first and second mate faces, and then ejecting the cooling flow into the gas path.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 5 illustrates an isometric view of the seal assembly of FIG. 3.
FIG. 6 illustrates a splined interface.
FIG. 7 illustrates another splined interface.
FIG. 8 illustrates a sectional view of a seal assembly including a seal according to another example.
FIG. 9 illustrates a perspective view of the seal of FIG. 8.
FIG. 10 illustrates an isometric view of the seal assembly of FIG. 8.
FIG. 11 illustrates adjacent seals.

DETAILED DESCRIPTION

Figure 1:
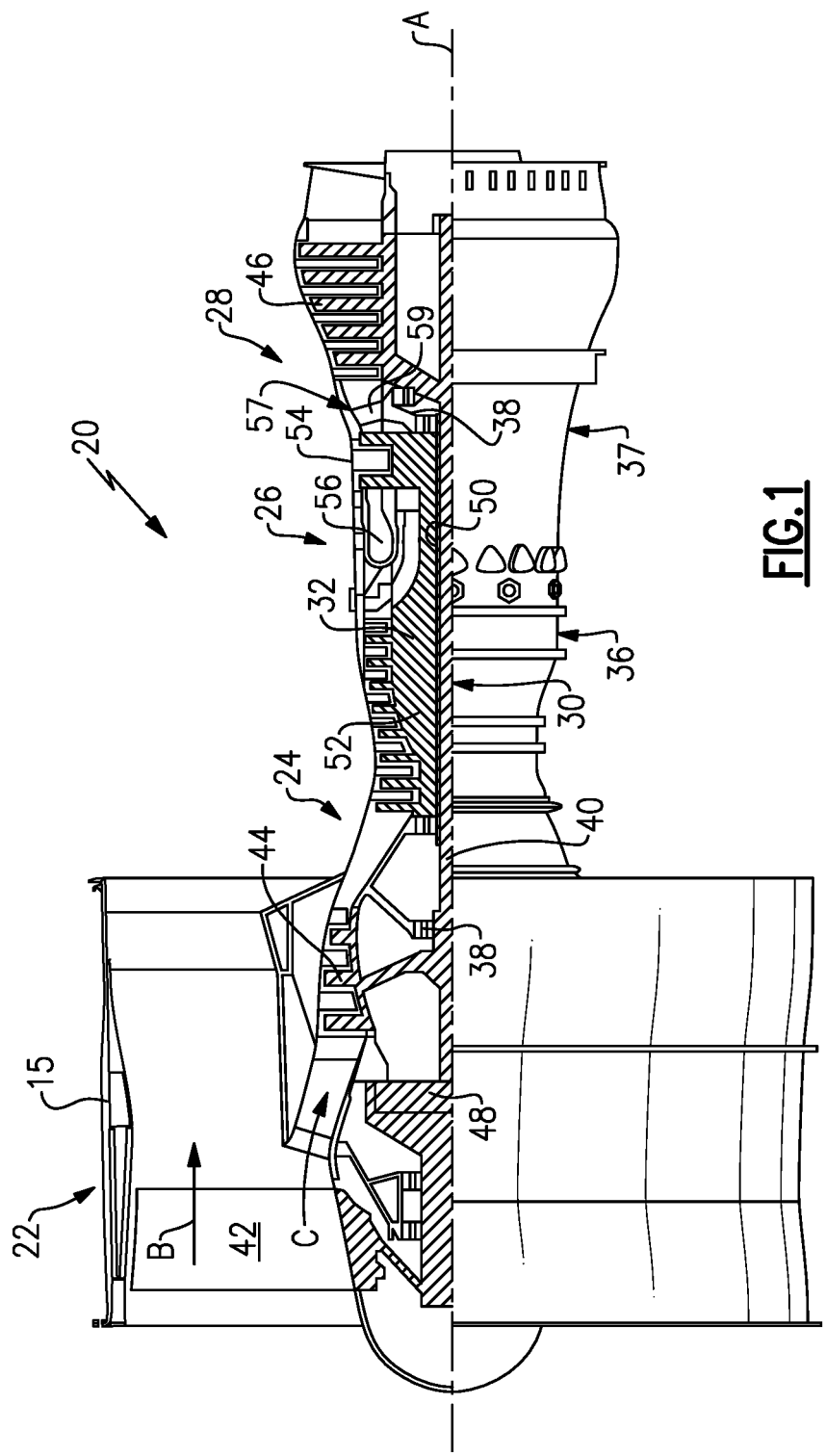
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
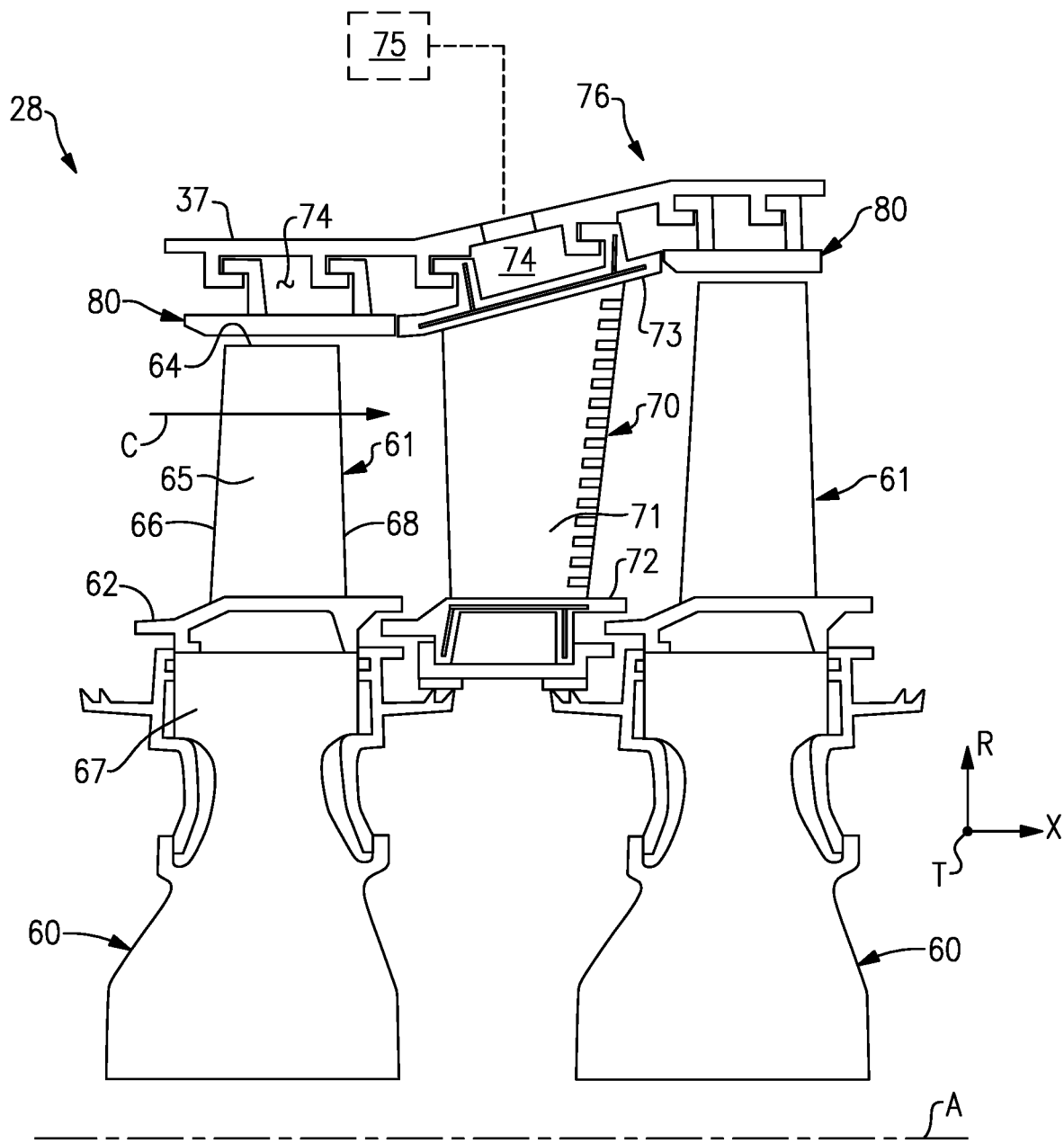
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A seal assembly 76 includes one or more blade outer air seals (BOAS) 80 that are each spaced radially outward from the tip 64 of the airfoil section 65. The BOAS 80 can include a plurality of seal arc segments (one shown in FIG. 5 at 180) that are circumferentially arranged in an annulus around the engine axis A to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 80 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 80. The engine case 37 provides a portion of the engine static structure 36 (FIG. 1) and extends along the engine axis A. The plenums 74 are configured to receive pressurized cooling flow from the cooling source(s) 75 to cool portions of the airfoil 61, BOAS 80 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 80 and/or vanes 70. The tips 64 of each of the airfoil sections 65 and adjacent BOAS 80 are in close radial proximity to reduce the amount of gas flow that escapes around the tips 64 through a corresponding clearance gap.

Figure 4:
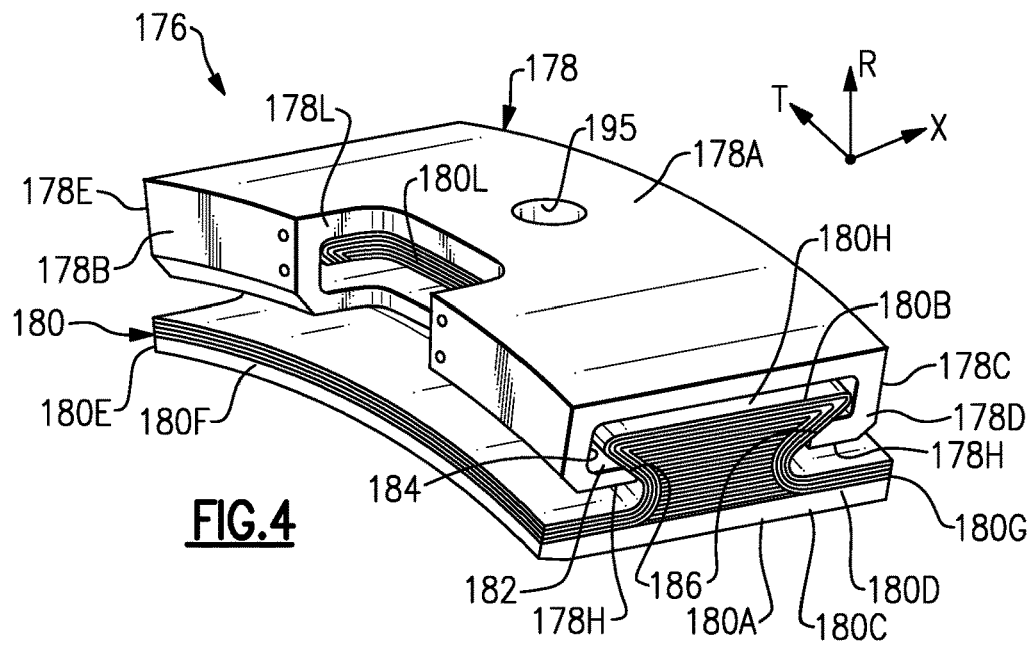
FIG. 4 illustrates a perspective view of a support and a seal of the seal assembly of FIG. 3.
Figure 3:
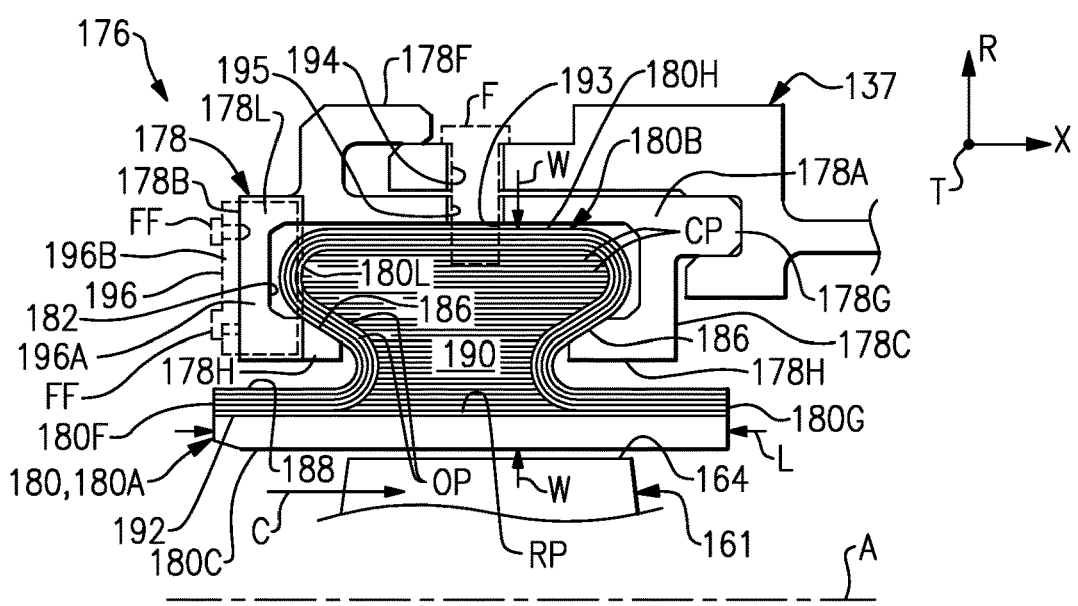
FIG. 3 illustrates a sectional view of a seal assembly.

FIGS. 3-5 illustrates an exemplary seal assembly 176 for sealing portions a gas turbine engine. The seal assembly 176 includes a support 178 and a seal 180. The seal assembly 176 can include an array of supports 178 and seals 180 arranged about the engine axis A. The seal assembly 176 can be utilized for the seal assembly 76 of FIG. 2 or incorporated into a portion of the engine 20 of FIG. 1, for example. In the illustrated example of FIGS. 3-5, the seal 180 is a blade outer air seal (BOAS). FIG. 3 is a sectional view of the seal assembly 176. FIG. 4 is a perspective view of the seal assembly 176 including the seal 180 in an installed position. FIG. 5 illustrates an isometric view of the seal assembly 176. Although the components discussed herein primarily refer to a BOAS in the turbine section 28, the teachings herein can also be utilized for other components of the engine 20, such as one of the platforms 62, 72, 73, an upstream stage of the compressor section 24, or combustor panels or liners defining portions of a combustion chamber located in the combustor section 26.

The support 178 is mountable to an engine static structure, such as engine case 137 (FIG. 3) or another portion of the engine static structure 36 (FIG. 1). The support 178 includes a main body 178A extends in an axial direction X between leading and trailing edge portions 178B, 178C. The main body 178A extends in a circumferential direction T between opposed mate faces 178D, 178E.

In the illustrated example of FIG. 3, the support 178 includes first and second retention hooks 178F, 178G that extend outwardly from the main body 178A. The retention hooks 178F, 178G are omitted from FIGS. 4 and 5 for illustrative purposes. The retention hooks 178F, 178G abut or otherwise engage with portions of the engine case 137 to secure the support 178 to the engine case 137. The retention hooks 178F, 178G can be moved in a circumferential direction T along the engine case 137 to mount the support 178 to the engine static structure.

The support 178 includes a pair of opposed retention hooks 178H for mechanically attaching or otherwise securing the seal 180 to the support 178. The retention hooks 178H extend inwardly from the respective leading and trailing edge portions 178B, 178C to bound an elongated circumferential groove 182. The retention hooks 178H are integrally formed with the main body 178A of the support. In other examples, the retention hooks 178H are separate and distinct components that are mechanically attached to the main body 178A.

The groove 182 extends circumferentially between the mate faces 178D, 178E and opens radially inward toward the engine axis A. Each of the mate faces 178D, 178E defines a respective opening 184 (FIGS. 4 and 5) to provide access to the groove 182 for mounting the seal 180.

An array of the seals 180 is circumferentially distributed about axis A and about an array of blades or airfoils 161 to bound a flow path, such as core flow path C. The quantity of supports 178 and quantity of seals 180 in each respective array can be the same or can differ.

The seal 180 can have a generally elongated and arcuate profile, as illustrated by FIGS. 4 and 5. The seal 180 includes a main (or seal) body having a sealing portion 180A that extends from an engagement portion 180B. The sealing portion 180A can extend radially inward from the engagement portion 180B when in the installed position. The sealing portion 180A includes a sealing face 180C that extends in the circumferential direction T between opposed first and second mate faces 180D, 180E. The sealing face 180C bounds the core flow path C. The sealing face 180C faces radially inward towards the engine axis A and is located in close proximity to a tip 164 of airfoil 161 to define a clearance gap.

The engagement portion 180B is dimensioned to be secured to the support 178 when in the installed position. The engagement portion 180B can extend a full width, or at least half the width, between the mate faces 180D, 180E of the sealing portion 180A, for example.

The engagement portion 180B can have a dovetail geometry that mates with the retention hooks 178H along an interface 186 (FIGS. 3-4) to secure the seal 180 to the support 178. Each interface 186 is established in the circumferential direction T between the first and second mate faces 180D, 180E. The retention hooks 178H can have a complementary geometry with the dovetail geometry along the interface 186 such that the engagement portion 180B can be slideably received along the interface 186 to secure the seal 180, thereby establishing a "bayonetted" circumferential assembly. Surfaces of the engagement portion 180B that establish the interface 186 generally face radially outward and away from the engine axis A, with the surfaces along the interface 186 sloping radially inward from the respective leading and trailing edge portions 178B, 178C toward the engine axis A to define a pair of contoured ramps (see FIG. 3).

The dovetail geometry and contouring can reduce mechanical stress on the seal 180, including seals made of a ceramic or composite matrix material which can be thermally resilient but relatively brittle. The dovetail geometry can define an acute angle, such as between about 30-60 degrees, to reduce mechanical stress. The circumferentially extending dovetail geometry also increases a length of engagement along the interface 186 (i.e., larger wheelbase), which can increase circumferential stability of each seal 180 and can reduce intersegment instability or variation in radial positioning between adjacent seals 180 along mate faces 180D, 180E due to thermal loads experienced by the seals 180 during engine operation. The dovetail geometry can also reduce deflection along the leading and trailing edges 180F, 180G of each seal 180 due to seal loads and pressure loads during engine operation.

The engagement portion 180B defines a backside face 180H opposite to, and radially outward of, the sealing face 180C when in the installed position. As illustrated by FIG. 3, the seal 180 defines a width W between the sealing face 180C and the backside face 180H. The sealing portion 180A defines a length L between the leading and trailing edges 180F, 180G. The seal 180 can be dimensioned to establish an aspect ratio defined as a ratio of the width W to the length L (W/L). In some examples, the ratio of W/L is less than about 1:1, or more narrowly less than about 2:3. In examples, the ratio of W/L is less than about 1:2 such that a cross-section of the seal 180 is elongated in the axial direction X. The exemplary ratios of W/L disclosed herein can establish a relatively smaller radial design space, and can reduce backside areas which influence higher heat transfer and cooling effectiveness, including cavity 298 (see FIGS. 8-11).

Various techniques can be utilized to secure the seal 180 to the engine case 137. In the illustrative example of FIGS. 3-5, the engine case 137 defines a bore 194, and the support 178 defines a bore 195. The bores 194, 195 can be substantially aligned with one another when in the installed position. A fastener F can be secured in the bores 194, 195 to mount the support 178 and seal 180 to the engine case 137, as illustrated by FIG. 3.

The seal assembly 176 can include one or more anti-rotation features to limit movement of the seal 180 in the axial, radial and/or circumferential directions X, R, T. For example, the fastener F can provide an anti-rotation feature. The engagement portion 180B can define a radially extending bore 193. As illustrated in FIG. 6, the fastener F is a pin, and each of the bores 193/194/195 can define a spline geometry that mates with a spline geometry of the fastener F. In other examples, the fastener F is a bolt that is threadably received in the bores 194, 195 and protrudes into the bore 193.

The seal assembly 176 can include anti-rotation features along the leading and/or trailing edge portions 178B, 178C such that the dovetail geometry is interrupted in the circumferential direction T. In the illustrated example of FIGS. 3-5, a first retention or locating feature 178L is defined along the leading edge portion 178B. The first locating feature 178L cooperates with a second retention or locating feature 180L defined in the engagement portion 180B of the seal 180 to limit relative movement.

In the installed position, the locating features 178L, 180L define keyways or recesses that are dimensioned to receive a clip or key 196 (shown in dashed lines in FIG. 3). As illustrated by FIG. 5, the key 196 includes a main body 196A and a pair of flanges 196B that extend outwardly from the main body 196A. The main body 196A has a geometry that complements the locating features 178L, 180L. The main body 196A of the key 196 is moved in a direction D2 and is inserted at least partially in the locating features 178L, 180L to oppose relative movement of the support 178 and the seal 180. The flanges 196B of the key 196 can be secured to the support 178 utilizing one or more fasteners FF (shown in dashed lines in FIG. 3). In some examples, main body 196A' defines a spline interface with locating features 178L', 180L', as illustrated by FIG. 7. The key 196 and locating features 178L, 180L can reduce rocking of the seal 180 during engine operation. The key 196 can be proximally retained by positive assembly of the section of the engine 20, in addition or alternatively to the fasteners FF, including the spline interface or other features of the support 178, abutment with vanes 70 (FIG. 2) arranged forward and/or aft of the seal assembly 176 relative to the engine axis A (see, e.g., vane 170' shown in dashed lines in FIG. 7).

The support 178 and seal 180 can be exposed to relatively high temperatures due to communication of hot gases along the core flow path C. Various materials can be utilized to manufacture the support 178 and seal 180, including a selection of materials to withstand the thermomechanical loads due to the high temperature environment.

In some examples, the seal 180 comprises a first material, and the support 178 comprises a second, different material. For example, the first material can include a ceramic or ceramic matrix composite (CMC) material, with seal 180 formed of one or more layers of a CMC layup. The seal 180 can be made of another material, such as a high temperature metal or alloy. The support 178 can be made of a second material such as a high temperature composite, metal, or alloy, such as a nickel-based superalloy. The first and second materials can differ. In other examples, the seal 180 is made of a first material, and the support 180 is made of a second material that is the same as the first material, including any of the materials disclosed herein. The seal 180 can be formed to have a unitary construction. In alternative examples, the sealing portion 180A and the engagement portion 180B are separate and distinct components that are mechanically attached to one another.

In the illustrated example of FIG. 3, the seal 180 is constructed of a CMC material. The seal 180 includes an overwrap 188 having one or more layers of overwrap plies OP stacked in layers to define a thickness of the seal 180. The overwrap plies OP are oriented to follow a perimeter of the engagement portion 180B between leading and trailing edges 180F, 180G to define the dovetail geometry. The overwrap plies OP extend along and establish the interface 186 when the seal 180 is located in the installed position.

The engagement portion 180B can include a core 190 at least partially surrounded by the overwrap 188. The core 190 extends in the circumferential direction T between the mate faces 180D, 180E. The overwrap 188 has a first fiber construction defined by the overwrap plies OP. The core 190 has second fiber construction, which can be the same or can differ from the first fiber construction. For example, the core 190 can be formed from preformed chop fiber strands that extend in different orientations throughout a thickness of the core 190 to define the second fiber construction. The overwrap plies OP can be constructed to provide cushioning or absorption of mechanical loads communicated along the interface 186 between the support 178 and the seal 180.

Figure 3A:
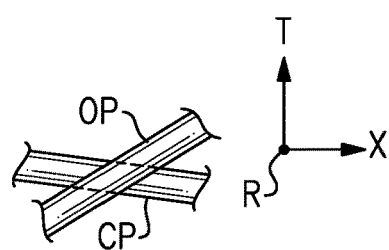
FIG. 3A illustrates a relative orientation of plies.

In the illustrated example of FIG. 3, the core 190 includes a plurality of core plies CP stacked in two-dimensional layers. At least some of the core plies CP can be oriented transversely to the overwrap plies OP. For example, a projection of each the core plies CP in the axial direction X is transverse to an orientation of the overwrap plies OP along the perimeter. A radial projection of the core plies CP can be oriented transversely to a radial projection of the overwrap plies OP along a perimeter of the engagement portion 180B defining the backside face 180H, as illustrated by FIGS. 3 and 3A. Overwrap 188 can include any two dimensional or three dimensional woven construction, including plain or satin two dimensional weaves. An orientation of each of the core plies CP can be the same, or each successive layer can differ from between about 1-15 degrees.

The seal 180 can include a reinforcement layer 192 that extends radially between the core 190 and sealing portion 180A. The reinforcement layer 192 can extend axially between the leading and trailing edges 180F, 180G, and can extend circumferentially between the first and second mate faces 180D, 180E. The reinforcement layer 192 can include one or more layers of reinforcement plies RP. The sealing portion 180A can comprise a ceramic, which can be applied as a coating to the reinforcement layer 192, for example, to define the sealing face 180C. In other examples, the reinforcement layer 192 defines the sealing face 180C and the coating is omitted.

Referring to FIG. 5, with continued reference to FIGS. 3-4, the seal assembly 176 can be assembled as follows. The engagement portion 180B is moved in a direction D1 and is slideably received through one of the openings 184 and then at least partially into the groove 182 to secure the seal 180 to the support 178 along the interface 186. The mate faces 180D, 180E of the seal 180 can be substantially aligned with the respective mate faces 178D, 178E of the support 178 when in the installed position.

Each set of supports 178 and seals 180 can be mounted to the engine case 137 by moving the supports 178 in the axial direction X to engage retention hooks 178F, 178G with the engine case 137 (FIG. 3). Thereafter, the fastener F can be secured in the bores 193, 194, 195 to secure the seal 180 to the engine case 137. Dimensioning and assembly of the components of the seal assembly 176 utilizing the teachings disclosed herein can reduce intersegment gap variation along the mate faces 180D, 180E, promote direct circumferential anti-rotation engagement, and reduce axial tipping due to the increased length of engagement along the interfaces 186.

FIGS. 8-11 illustrate a seal assembly 276 according to another example. Seal 280 can have a hollow construction to reduce weight and to circulate cooling flow F to cool portions of the seal 280 during engine operation. Engagement portion 280B defines an internal cavity 298 that extends circumferentially between mate faces 280D, 280E of the seal 280.

In the illustrated example of FIG. 8, the seal 280 includes one or more overwrap plies OP including a first (or exterior) set of overwrap plies OP1 that follow a perimeter of the engagement portion 280B and a second (or interior) set of overwrap plies OP2 that follow a perimeter of the internal cavity 298. The internal cavity 298 can be free of any core such that cooling flow F from coolant source 275 can be circulated into and through the internal cavity 298 to cool adjacent portions of the seal 280. The second set of overwrap plies OP2 can be formed on a mandrel or tool to provide the respective geometry of the internal cavity 298.

The seal 280 includes reinforcement layer 292 having a set of reinforcement plies RP that extend along the first and second sets of plies OP1, OP2 to define sealing portion 280A. A fiber filler, such as chopped fiber preform, can be placed in regions RF (FIG. 8) between the plies OP1, OP2 and/or RP to reduce voids in a volume of the seal 280.

The engagement portion 280B defines one or more cooling passages 299 in fluid communication with the internal cavity 298. Main body 278A of support 278 defines one or more apertures 297 that interconnect the cooling passages 299 with the coolant source 275. The apertures 297 communicate cooling flow F between the coolant source 275 and the internal cavity 298. Each engagement portion 280B can define one or more openings 291 along each of the respective mate faces 280D, 280E to provide access to the internal cavity 298.

The backside face 280H of the seal 280 can be spaced apart from the support 278 to establish a plenum 274, as illustrated by FIG. 8, or can be brought into abutment when in the installed position. The support 278 can define one or more apertures 297' (shown in dashed lines in FIG. 8) offset from the cooling passages 299. The apertures 297' can be oriented to eject cooling flow F in a direction towards surfaces of the backside face 280H of the seal 280 to provide impingement cooling for adjacent portions of the seal 280.

A length of the sealing portion 280A can be dimensioned according to expected pressure loads during engine operation. In the illustrated example of FIG. 8, the sealing portion 280A defines a first length L1 between leading edge 280F and the dovetail geometry defined by the engagement portion 280B. The sealing portion 280A defines a second length L2 between trailing edge 280G and the dovetail geometry. The first length L1 can differ from the second length L2. In the illustrated example of FIG. 8, the first length L1 is greater than the second length L2 to accommodate relatively greater pressure loads along the second length L2 of the sealing portion 280A.

During operation, pressurized cooling flow F is communicated from the coolant source 275 to the cooling passages 299 and then into the internal cavity 298. Referring to FIG. 11 with continued reference to FIGS. 6-8, a pair of adjacent seals 280 is illustrated as seals 280-1, 280-2. Cooling flow F is communicated from the internal cavity 298 and through the through the respective openings 291, and into an intersegment gap G defined by mate faces 280D, 280E of the seals 280-1, 280-2. The cooling flow F can be ejected from the intersegment gap G into the gas path radially inward of the sealing faces 280C. The cooling arrangement of seal assembly 276 can reduce thermal gradients across the portions of the seals 280 during engine operation and can improve durability, for example.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
a support mountable to an engine static structure, the support including a main body extending axially between leading and trailing edge portions and circumferentially between opposed mate faces, and the main body including a pair of opposed retention hooks extending radially inwardly from the leading and trailing edge portions to bound an elongated groove extending circumferentially between the opposed mate faces; and
a seal including a sealing portion that extends from an engagement portion, the sealing portion including a sealing face that extends circumferentially between first and second mate faces, and an overwrap including one or more plies that follow a perimeter of the engagement portion to define an interface between the retention hooks and the engagement portion, wherein the engagement portion defines an internal cavity that extends circumferentially between the first and second mate faces.

2. The seal assembly as recited in claim 1, wherein the perimeter defines a dovetail geometry that mates with the retention hooks along the interface to secure the seal.

3. The seal assembly as recited in claim 1, wherein the engagement portion includes a core surrounded by the overwrap.

4. The seal assembly as recited in claim 3, wherein the overwrap has a first fiber construction defined by the one or more plies, and the core has a second fiber construction that differs from the first fiber construction.

5. The seal assembly as recited in claim 4, wherein the sealing portion comprises ceramic.

6. The seal assembly as recited in claim 1, wherein the one or more plies includes a first set of plies that follow the perimeter of the engagement portion and a second set of plies that follow a perimeter of the internal cavity.

7. The seal assembly as recited in claim 6, wherein the seal includes a set of reinforcement plies that extend along the first and second set of plies to define the sealing portion.

8. The seal assembly as recited in claim 1, wherein the engagement portion defines one or more cooling passages in fluid communication with the internal cavity, and the main body defines one or more apertures that interconnect the one or more cooling passages with a coolant source.

9. The seal assembly as recited in claim 8, wherein the engagement portion defines openings to the internal cavity along the first and second mate faces.

10. The seal assembly as recited in claim 1, wherein the support defines a first retention feature along one of the leading edge portion and the trailing edge portion, and the first retention feature cooperates with a clip insertable into the first retention feature and a second retention feature defined in the engagement portion of the seal to limit relative movement.

11. The seal assembly as recited in claim 10, wherein:
the engagement portion defines one or more cooling passages in fluid communication with the internal cavity, and the main body defines one or more apertures that interconnect the one or more cooling passages with a coolant source;
the engagement portion defines openings to the internal cavity along the first and second mate faces dimensioned to convey coolant from the internal cavity to intersegment gaps established along respective ones of the first and second mate faces; and
the second retention feature is an elongated slot that extends through the overwrap along an axially facing sidewall of the engagement portion to establish an opening along the internal cavity at a position that is circumferentially spaced apart from both the first and second mate faces.

12. The seal assembly as recited in claim 1, wherein the engagement portion defines a backside face radially opposite the sealing face, the seal defines a width between the sealing face and the backside face, and the sealing portion defines a length between a leading edge and a trailing edge, and a ratio of the width to the length is less than 1:2.

13. The seal assembly as recited in claim 1, wherein the seal is a blade outer air seal (BOAS).

14. A gas turbine engine comprising:
an engine case extending along an engine axis;
an array of blades rotatable about the engine axis;
a seal assembly including an array of supports and an array of blade outer air seals;
wherein the array of supports are distributed circumferentially about the engine axis, the array of supports are mechanically attached to the engine case, each of the supports including a main body extending axially between leading and trailing edge portions and circumferentially between opposed mate faces with respect to the engine axis, and the main body including a pair of opposed retention hooks that extend radially inwardly with respect to the engine axis to bound an elongated groove, the elongated groove extending circumferentially between the opposed mate faces with respect to the engine axis; and
wherein the array of blade outer air seals are distributed circumferentially about the array of blades with respect to the engine axis, and each of the seals comprises:

a sealing portion that extends from an engagement portion, the sealing portion including a sealing face that extends circumferentially between first and second mate faces to bound a core flow path, and an overwrap including a plurality of plies that follow a perimeter of the engagement portion to define an interface; and wherein the engagement portion is slideably received circumferentially through an opening defined in one of the opposed mate faces and at least partially into the elongated groove to secure the seal to a respective one of the supports along the interface, and the engagement portion defines an internal cavity that extends circumferentially between the first and second mate faces.

15. The gas turbine engine as recited in claim 14, wherein the perimeter defines a dovetail geometry that mates with the retention hooks along the interface to secure the seal.

16. The gas turbine engine as recited in claim 15, wherein the engagement portion includes a core surrounded by the overwrap, the overwrap has a first fiber construction defined by the plurality of plies, and the core has a second fiber construction that differs from the first fiber construction.

17. The gas turbine engine as recited in claim 14, wherein the engagement portion defines one or more cooling passages that interconnect the internal cavity and a cooling plenum defined by the engine case.

18. The gas turbine engine as recited in claim 17, wherein the array of seals establish a plurality of intersegment gaps between the first and second mate faces of adjacent pairs of the seals, the intersegment gaps are distributed circumferentially about the engine axis, and the internal cavity is dimensioned to convey coolant from a coolant source to a respective pair of the intersegment gaps.

19. The gas turbine engine as recited in claim 18, further comprising:

a plurality of clips and a plurality of splined fasteners;

wherein each of the supports defines a first retention feature along one of the leading edge portion and the trailing edge portion;

wherein each of the seals defines a second retention feature, and the second retention feature is an elongated slot that extends through the overwrap along a sidewall of the engagement portion of the seal to establish an opening between the perimeter of the engagement portion and the internal cavity;

wherein each of the clips includes a main body dimensioned to complement a geometry of the elongated slot to limit rotation of the seal about a first axis that extends in an axial direction relative to the engine axis; and wherein each of the splined fasteners mates with a splined bore in a respective one of the supports and a splined bore in the engagement portion of a respective one of the seals to establish a splined interface spaced apart from the first and second retention features, and the splined interface is dimensioned to limit rotation of the respective seal about a second axis that extends in a radial direction relative to the engine axis.

20. A method of sealing a gas turbine engine, comprising:

securing a support to an engine static structure, the support including a main body extending axially between leading and trailing edge portions and circumferentially between opposed mate faces, and the body including a pair of opposed retention hooks that extend radially inwardly to bound an elongated groove, the elongated groove extending circumferentially between the opposed mate faces; and securing a blade outer air seal to the support, wherein the seal comprises:

a sealing portion extending from an engagement portion, the sealing portion including a sealing face that extends circumferentially between first and second mate faces to bound a gas path, and an overwrap including one or more plies that follow a perimeter of the engagement portion to define an interface between the retention hooks and the engagement portion; and wherein the engagement portion is slideably received circumferentially through an opening defined in one of the opposed mate faces and then at least partially into a circumferentially extending groove to secure the seal to the support along the interface, and the engagement portion defines an internal cavity that extends circumferentially between the first and second mate faces.

21. The method as recited in claim 20, wherein the engagement portion defines one or more cooling passages that interconnect the internal cavity and a coolant source, and further comprising the step of communicating cooling flow from the coolant source to the one or more cooling passages, and then into the internal cavity.

22. The method as recited in claim 21, further comprising communicating cooling flow from the internal cavity into an intersegment gap defined by a respective one of the first and second mate faces, and then ejecting the cooling flow into the gas path.

\* \* \* \* \*